April 23, 1963 M. D. COMPTON 3,086,880
METHOD OF PRODUCING A GLAZED CERAMIC ARTICLE
AND THE GLAZED ARTICLE
Filed May 8, 1961
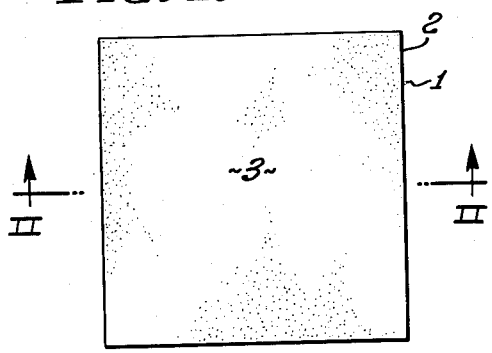
FIG. 1.
FIG. 2.
FIG. 3.
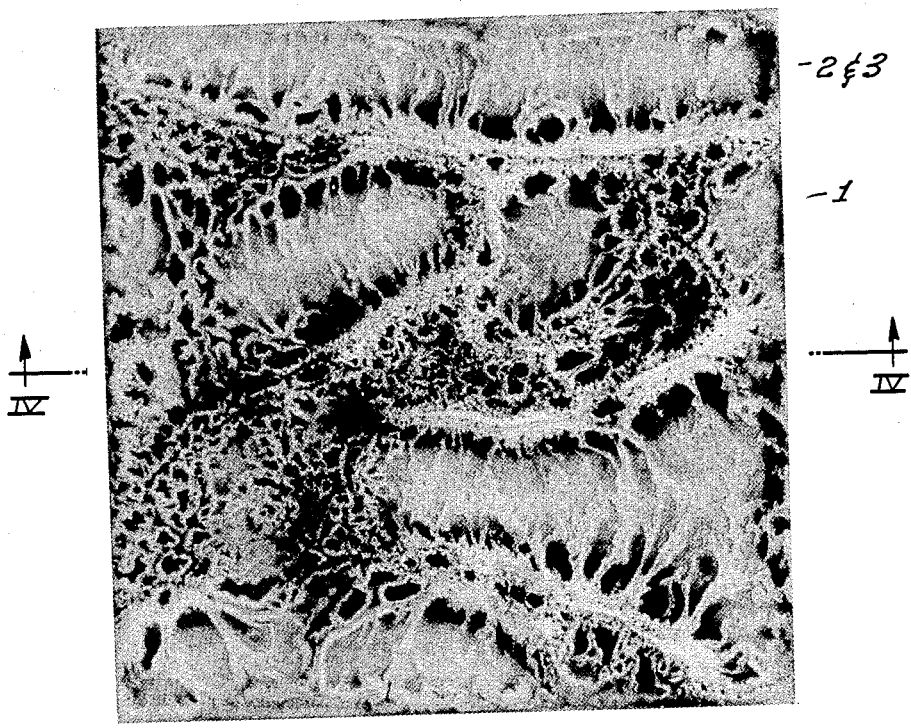
FIG. 4.
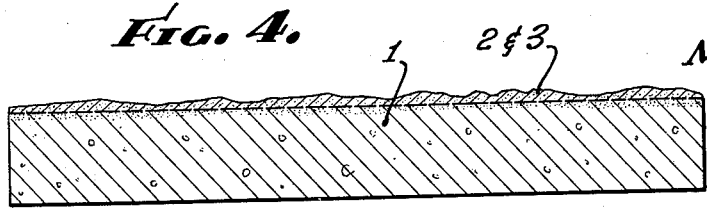
INVENTOR.
MAX D. COMPTON
By
Miketta and Glenny
ATTORNEYS.

3,086,880
METHOD OF PRODUCING A GLAZED CERAMIC ARTICLE AND THE GLAZED ARTICLE
Max D. Compton, Glendale, Calif., assignor to Gladding, McBean & Co., Los Angeles, Calif., a corporation of California
Filed May 8, 1961, Ser. No. 108,370
5 Claims. (Cl. 117—40)

The present invention relates to novel decorative ceramic articles and methods for producing such articles. More particularly, the present invention relates to ceramic articles with decorative glazed surfaces presenting a unique marbleized, textured appearance.

The art of decorating ceramic bodies has been practiced for centuries by applying glaze-forming compositions containing coloring materials. A common method of decorating ceramic objects, such as wall tile, dinnerware etc., is to simply spray the surface of the formed object with a finely divided glaze forming composition and then burn the sprayed object to a temperature and for a time sufficient to mature and bond the glaze to the object. Uniform coloration and a smooth, impervious surface is thus obtained. Where non-uniform coloration or additional decoration is desired, recourse is generally had to the use of decals or hand painted decoration, with or without the use of a substantially transparent overglaze. Although these methods of decoration can be used on relatively expensive objects such as dinnerware, they are not well adapted for use on wall tile or other relatively inexpensive products because of the time, labor and expense involved.

Another method comprises the application of glaze compositions in a predetermined pattern to the surface of the formed ceramic object (as by a silk screen process) followed by the application of a clear or transparent glaze. This again is an expensive process and results in products of monotonous regularity and identity. In all of these prior methods, the glaze compositions are carefully matched or "fitted" to the ceramic body composition (in terms of coefficient of expansion) to preclude crazing, chipping, cracking, flaking off etc. The maturing temperatures of the under glaze and over glaze are virtually identical and the firing takes place at a temperature within the overlapping maturing temperature of the glaze compositions employed (as in Harlan et al. Pat. No. 2,587,152). Also, the resulting surface even where a mat finish is obtained is necessarily smooth, slippery and highly reflective. In addition, the only color pattern which can be obtained is substantially the one initially laid out when the glaze compositions are applied to the ceramic body.

The present invention represents a unique and unusual departure from the present limitation of application of colored glaze compositions in definite predetermined patterns. The decorated surface of the ceramic article of the present invention presents a marbleized, textured appearance which has large areas of glaze composition with superimposed variegated random, irregular, raised areas of glaze compositions of different colors. The overlying glaze composition which forms the mottled, veined pattern can be initially applied uniformly over the base glaze composition so that use of techniques such as silk screens carrying the desired pattern is eliminated. The raised areas of glaze composition render the surface as a whole relatively non-slipping and greatly diminish its reflectivity by producing reflections in various directions.

In addition, the unique marbleized textured surface of the present invention can be obtained by the addition of ceramic pigments to either the base glaze composition or the overlying glaze composition or both and the resulting color pattern contains many striking variations of color shadings and patterns. Such color shadings combined with the raised portions of the surface create a three-dimensional effect which greatly increases the attractiveness and saleability of the ceramic article.

In general the present invention comprises first applying a base glaze composition to the smooth surface of a finely porous ceramic article in a continuous, uniform thickness coating. The base glaze composition contains in molecular ratio less than 0.7 $Na_2O$, $K_2O$ and $PbO$ combined to 1.0 $SiO_2$ and is adapted to not react with the ceramic composition. Then a second glaze composition coating is applied to the entire surface of the base glaze coating to form an overlying layer not substantially thicker than the base coating. The overlying glaze composition coating has a maturing temperature range not less than about two cones above the maturing temperature range of the base glaze composition. Then the coated ceramic article is fired to a temperature within the maturing temperature range of the base glaze composition. The overlying second glaze composition thereby becomes discontinuous and diffused into the base coating in a raised variegated, mottled, veined pattern so that the article presents a decorative, marbleized textured surface with relatively non-slip, non-reflective characteristics.

From the foregoing general description, it can be seen that an object of the present invention is a novel decorative ceramic article and methods of producing such article.

Another object of the present invention is the production of marbleized, textured ceramic articles which are relatively non-slipping and have controllable reflectivity.

Still another object of the present invention is a method employing initially two uniform layers of glaze composition on a ceramic article, one of said layers having a maturing temperature range not less than about two cones above the maturing temperature range of the other layer with the coated ceramic article being fired at a temperature within the lower temperature range.

Other objects and advantages of this invention will be readily apparent from the following description and figures in which are illustrated exemplary embodiments of the present invention.

FIG. 1 is a top view of a ceramic tile with the two layers of the glaze compositions of the present invention applied.

FIG. 2 is a transverse cross-section of FIG. 1 taken along plane II—II.

FIG. 3 is a photograph of the tile of FIG. 1 after it has been fired as set forth in the present invention.

FIG. 4 is an enlarged cross-section of FIG. 3 taken along plane IV—IV.

In FIGS. 1 and 2, there is illustrated a ceramic tile 1 which may be formed by any desired method, as by dry pressing, and may be either in the green or bisque-burned state. Applied to a surface of tile 1 is a continuous, uniformly thick coating 2 of base glaze composition. Overlying base coating 2 is a second glaze composition coating 3 which covers the entire surface of the base coating 2 and is preferably thinner than base coating 2. The glaze composition in the overlying coating 3 has a maturing temperature range whose lowest temperature is not less than about two cones above the highest temperature of the maturing temperature range of the base glaze composition. In FIG. 3, the ceramic tile 1 of FIGS. 1 and 2 is illustrated by photograph after it has been fired at a temperature within the maturing range of the base glaze composition. FIG. 4 is a drawing of an enlarged cross-section of FIG. 3. The overlying coating 3 has been modified by the base coating 2 and has collected into irregular ridges and diffused into the base coating 2 in a variegated, mottled, veined pattern which can only be described adequately by an actual photograph. A portion of base coating 2 becomes uncovered by the overlying coating 3 and forms a background for the unique decorative marbleized textured surface formed by the overlying coating 3. The two coatings mutually cooperate in producing the desired effect.

While the general characteristics of the present invention can be described by FIGS. 1–4, only illustrative embodiments give specific details with respect to steps and compositions. The following specific examples of glaze compositions in Table I were applied to a 4¼ in. x 4¼ in. wall tile which had been dry pressed and then bisque-burned. Each glaze composition was mixed with water weighing about one-half of its weight, ball milled for about sixteen hours to form a fine suspension and finally applied to the tile by spraying. To each base glaze composition, a desired coloring oxide was added in the amount of about 1% to 3% by weight of the base glaze composition. The base glaze composition was sprayed to a thickness of about 0.020 in. while the overlying glaze composition was sprayed to a thickness of about 0.018 in. in some cases and to various lesser thicknesses (as low as 0.006 in.) in other cases. The coated tile was then fired to cone 01 at an approximate twelve hour schedule in a regular production tile kiln. The final glazed surface after firing varied in thickness on each tile, generally from about 0.008 in. to 0.06 in.

It may be noted that the thickness of the glaze (after firing) was not uniform and varied from thin areas (thinner than the thickness of the coating of unfired glaze) to thick areas which were thicker than the base thickness of the combined coatings of unfired glaze composition. In all instances good tenacious adherence as well as the unique marbleized effect was obtained.

TABLE I

*Molecular Composition of Glazes*

[#1. Base glaze composition—glossy]

| .053 $K_2O$<br>.202 $Na_2O$<br>.170 PbO<br>.335 CaO<br>.206 ZnO<br>.034 BaO | .043 $Al_2O_3$<br>.334 $B_2O_3$ | 1.52 $SiO_2$<br>.082 $ZrO_2$ |
|---|---|---|

[#1. Overlying glaze composition—glossy]

| .469 ZnO<br>.531 CaO | .453 $Al_2O_3$ | 3.43 $SiO_2$<br>.404 $ZrO_2$ |
|---|---|---|

[#2. Base glaze composition—matte]

| .056 $K_2O$<br>.256 $Na_2O$<br>.172 PbO<br>.269 CaO<br>.214 ZnO<br>.034 BaO | .044 $Al_2O_3$<br>.264 $B_2O_3$ | 1.66 $SiO_2$<br>.168 $ZrO_2$ |
|---|---|---|

[#2. Overlying glaze composition—mat]

| .065 $K_2O$<br>.211 $Na_2O$<br>.392 CaO<br>.332 ZnO | .447 $Al_2O_3$ | 3.54 $SiO_2$<br>.382 $ZrO_2$ |
|---|---|---|

[#3. Base glaze composition—mat]

| .095 $K_2O$<br>.148 $Na_2O$<br>.189 PbO<br>.531 CaO<br>.037 BaO | .047 $Al_2O_3$<br>.453 $B_2O_3$ | 1.53 $SiO_2$<br>.163 $ZrO_2$ |
|---|---|---|

[#3. Overlying glaze composition—mat]

| .073 $K_2O$<br>.237 $Na_2O$<br>.154 PbO<br>.536 CaO | .502 $Al_2O_3$ | 3.74 $SiO_2$<br>.428 $ZrO_2$ |
|---|---|---|

The novel decorative effects of the present invention may be applied to many different kinds of ceramic bodies including various clay or talc bodies. Various body compositions of the types described in Patents 2,025,762; 2,072,460; 2,073,136; 2,241,705; and 2,159,349 as well as feldspathic bodies, high magnesia bodies, high clay bodies, and earthenware bodies, can be employed. Generally, such bodies are finely porous and incompletely vitrified after burning (may have an absorption of 3 to 15% by weight) but vitrified articles may also be produced by this invention. The objects to be treated by the present invention may be originally formed by dry-pressing, molding, casting or jiggering and may be either green or bisque-burned at the time the glaze composition coatings are applied. The glaze compositions are preferably applied to such bodies by spraying but any other common method may be used such as dipping or contact transfer.

The base glaze composition of the present invention must have a sufficient high maturing temperature range to avoid excessive fluidity and maintain resistance to abrasion, water and acids after burning. In addition, the base glaze composition must substantially not react with, flux and destroy the ceramic composition upon which it is applied. Such characteristics are obtained in base glaze compositions which contain (in molecular ratio) less than 0.7 $K_2O$, $Na_2O$ and PbO combined to 1.0 $SiO_2$. Such base glaze compositions usually have a maturing temperature range from about cone 04 to cone 01.

The overlying glaze composition of the present invention must have a maturing temperature range not less than about two cones above the maturing temperature range of the base glaze composition. Preferably the overlying glaze composition has a maturing temperature range of about two to eight cones above the maturing temperature range of the base glaze composition. For example, when the base glaze composition has a maturing temperature range from cone 04 to cone 01 (end points 1050° C. and 1110° C. respectively) then the overlying glaze composition may have a maturing temperature above about cone 5 (end point 1180° C.). Such difference in maturing temperature ranges results in the overlying glaze composition being substantially more viscous than the base glaze composition. Also the overlying glaze composition coating must not be substantially thicker than the base glaze composition coating and preferably it should be thinner. Very good results are obtained when the overlying coating is applied to a thickness from about 0.002 in. to 0.015 in. while the base coating is applied to a thickness from about 0.010 in. to 0.030 in. The thickness of the overlying coating in comparison with the base coating has a substantial effect on the texture of the final surface after firing with the thicker overlying coatings giving higher ridges. The texture of the final surface after firing is also markedly affected by the difference in the maturing temperature range between the overlying glaze composition and the base glaze composition with higher ridges being obtained with greater differences. Since the maturing temperature range of the overlying glaze is dependent largely on its composition, it has been found that the maximum depth of texture is obtained when the $Al_2O_3$ concentration approaches 16% by weight and the $SiO_2$ concentration approaches 60% by weight. However, at such maximum concentrations, substantial pitting occurs in the final surface after firing so preferably the content of $Al_2O_3$ and $SiO_2$ should be kept below such maximum concentrations.

The following theory may be regarded as a probable explanation for the unusual and unexpected results obtained and not as a limitation upon the invention. When fired at its maturing temperature the base glaze fluxes the overlying glaze (whose maturing temperature when fired alone is not reached). When fusing, the overlying glaze being much more viscous, tends to pull itself together rather than flow and also tends to pull with itself a portion of the base glaze. Such mixing of the glazes combined with the tendency of the overlying glaze to pull itself together forms the unique variegated raised, mottled, veined pattern of the present invention so that the glazed article presents a marbleized, textured surface.

There are many ways of varying the pattern and color effects obtained by the present invention. If $CaF_2$ is added to the base glaze composition in place of ZnO then an entirely different type of texture and marbleizing results. If both ZnO and $CaF_2$ are added to the base composition then still another type of texture and marbleizing is obtained. Also ceramic pigments and/or opacifiers may be added to either the base glaze composition or the overlying glaze composition or both compositions and in each case markedly different color tones and types of marbleizing are obtained. Among the common ceramic pigments which may be used are oxides of metals such as cobalt, chromium, cadmium, nickel, iron, manganese and copper. Also the present invention may be carried out by applying the base glaze composition to a ceramic body, firing, then applying the overlying glaze composition and subjecting the ceramic body to still further firing.

It will be understood that the foregoing description and examples are only illustrative of the present invention and it is not intended that the invention be limited thereto since many other specific embodiments of the present invention will be obvious to one skilled in the art in view of the disclosure. All substitutions, alterations, and modifications of the present invention which come within the scope of the following claims or to which the present invention is readily susceptible without departing from the spirit and scope of this disclosure are considered as part of the present invention.

I claim:

1. A method of producing novel ceramic articles with an impervious tenaciously adhering glazed surface in which different colored tones produce a marbleized and textured decorative effect, comprising: applying a first base glaze composition to the smooth surface of a finely porous ceramic composition article to form a continuous coating thereon of virtually uniform thickness, said base glaze composition containing in molecular ratio less than 0.7 $Na_2O$, $K_2O$ and PbO combined to 1.0 $SiO_2$ and adapted to not react with, flux and destroy the ceramic composition; applying a second glaze composition coating to the entire surface of said base glaze coating to form an overlying layer not substantially thicker than the said base coating, said second glaze composition having a maturing temperature range not less than about two cones above the maturing temperature range of the base glaze composition; and firing the article so coated to a temperature within the maturing temperature range of said base glaze composition whereby the overlying second glaze composition coating diffuses into said base coating and becomes discontinuous during firing and produces an overall marbleized textured effect.

2. A method as stated in claim 1 wherein said overlying second glaze composition layer is thinner than said base coating.

3. A method as stated in claim 1 wherein said base glaze composition contains a substantial proportion of a member of the group consisting of ZnO and $CaF_2$.

4. A method as stated in claim 1 wherein said second glaze composition has a maturing temperature range of two to eight cones above the maturing temperature range of the base glaze composition.

5. A novel article composed of a finely porous ceramic body with a continuous, uniform base glaze composition coating, said base glaze composition containing in molecular ratio less than 0.7 $Na_2O$, $K_2O$ and PbO combined to 1.0 $SiO_2$ and a second glaze composition, having a maturing temperature range not less than about two cones above the maturing temperature range of the base glaze composition, said second glaze composition overlying and being diffused into said base glaze composition in a raised, variegated, mottled, veined pattern whereby said article has a decorative, marbleized, textured surface.

References Cited in the file of this patent

UNITED STATES PATENTS

| | | |
|---|---|---|
| 1,693,252 | Prouty | Nov. 27, 1928 |
| 2,292,369 | Gordon | Aug. 11, 1942 |
| 2,466,682 | Bryant | Apr. 12, 1949 |
| 2,602,758 | Olt et al. | July 8, 1952 |
| 2,832,695 | Compton et al. | Apr. 29, 1958 |